United States Patent
Nakayama et al.

(10) Patent No.: US 6,583,085 B1
(45) Date of Patent: Jun. 24, 2003

(54) METHOD FOR MANUFACTURING INDIUM-TIN-IRON CATALYST FOR USE IN PRODUCTION OF CARBON NANOCOILS

(75) Inventors: Yoshikazu Nakayama, 9-404, 14-2, Korigaoka 1-chome, Hirakata-shi, Osaka 573-0084 (JP); Akio Harada, Osaka (JP)

(73) Assignees: Yoshikazu Nakayama, Osaka (JP); Daiken Chemical Co., Ltd., Osaka (JP)

(*) Notice: Subject to any disclaimer, the term of this patent is extended or adjusted under 35 U.S.C. 154(b) by 48 days.

(21) Appl. No.: 10/040,160

(22) Filed: Oct. 26, 2001

(51) Int. Cl.$^7$ ............... B01J 23/40; B01J 23/42; B01J 23/56; B01J 23/70; B01J 23/74
(52) U.S. Cl. ............... 502/332; 502/327; 502/336; 502/338; 502/352
(58) Field of Search ............... 502/327, 332, 502/336, 338, 352

(56) References Cited

U.S. PATENT DOCUMENTS

| | | | | |
|---|---|---|---|---|
| 4,404,447 A | * | 9/1983 | Kitamura et al. | 219/64 |
| 4,594,182 A | * | 6/1986 | Hashimoto et al. | 252/518 |
| 4,824,221 A | * | 4/1989 | Endo et al. | 350/357 |
| 4,969,956 A | * | 11/1990 | Kreider et al. | 136/201 |
| 5,071,800 A | * | 12/1991 | Iwamoto et al. | 501/126 |
| 5,401,701 A | * | 3/1995 | Ogawa et al. | 501/134 |
| 5,417,816 A | * | 5/1995 | Nakashima et al. | 204/96 |
| 5,480,532 A | * | 1/1996 | Schlott et al. | 204/298.13 |
| 5,580,496 A | * | 12/1996 | Yukinobu et al. | 252/518 |
| 5,772,924 A | * | 6/1998 | Hayashi et al. | 252/520.1 |
| 5,853,887 A | * | 12/1998 | Yoshimoto et al. | 428/404 |
| 5,866,493 A | * | 2/1999 | Lee et al. | 501/134 |
| 6,096,285 A | * | 8/2000 | Hayashi et al. | 423/618 |
| 6,286,226 B1 | * | 9/2001 | Jin | 33/706 |
| 6,291,094 B1 | * | 9/2001 | Yoshimura et al. | 429/34 |
| 6,340,822 B1 | * | 1/2002 | Brown et al. | 257/25 |
| 6,383,923 B1 | * | 5/2002 | Brown et al. | 438/666 |

FOREIGN PATENT DOCUMENTS

EP          0 697 673 A2 *  2/1996

* cited by examiner

Primary Examiner—Stanley S. Silverman
Assistant Examiner—Cam N. Nguyen
(74) Attorney, Agent, or Firm—Koda & Androlia

(57) ABSTRACT

A method for manufacturing an indium-tin-iron catalyst that is used to obtain carbon nanocoils that have an external diameter of 1000 nm or less, the method comprising a first process that forms an organic solution by mixing an indium-containing organic compound and a tin-containing organic compound with an organic solvent, a second process that forms an organic film by coating a substrate with the thus obtained organic solution, a third process that forms an indium-tin film by baking this organic film, and a fourth process that forms an iron film on the surface of this indium-tin film.

4 Claims, No Drawings

METHOD FOR MANUFACTURING INDIUM-TIN-IRON CATALYST FOR USE IN PRODUCTION OF CARBON NANOCOILS

BACKGROUND OF THE INVENTION

1. Field of the Invention

The present invention relates to a method for manufacturing an indium-tin-iron type catalyst which is used for producing carbon nanocoils that have an external diameter of 1000 nm or less and more particularly to a method for manufacturing an indium-tin-iron type catalyst for use in the production of carbon nanocoils which allows inexpensive mass production by utilizing metal-containing organic compounds and an organic solvent.

2. Prior Art

The history of carbon nanocoils in which the external diameter of the coil is on the order of nanometers is relatively brief.

In 1994, Amelinckx et al. (Amelinckx, X. B. Zhang, D. Bernaerts, X. F. Zhang, V. Ivanov and J. B. Nagy, SCIENCE, 265 (1994) 635) succeeded in producing carbon nanocoils. While carbon microcoils discovered in the past have an amorphous structure, it has been ascertained that carbon nanocoils have a graphite structure. Various types of carbon nanocoils have been prepared, and the smallest coil external diameter achieved so far is extremely small, i.e., approximately 12 nm. However, the coil yield is small, and such a method cannot be utilized in industrial production. Accordingly, there has been a demand for a more efficient method of manufacture of nanocoils.

In the manufacturing method used by the above researchers, a metal catalyst such as Co, Fe or Ni is formed into a very fine powder, the area in the vicinity of this catalyst is heated to a temperature of 600 to 700° C., an organic gas such as acetylene or benzene is caused to flow through so that the gas contacts the catalyst, and then the organic molecules are broken down. The carbon nanocoils that are produced have various shapes, and these shapes are merely produced at random.

In 1999, Li et al. (W. Li, S. Xie, W. Liu, R. Zhao, Y. Zhang, W. Zhou and G. Wang, J. Material Sci., 34 (1999) 2745) succeeded anew in producing carbon nanocoils. In the method used by these researchers, a catalyst formed by covering the surface of a graphite sheet with iron particles is placed in the center of the reaction vessel, and the area in the vicinity of this catalyst is heated to 700° C. by means of a nichrome wire. A mixed gas consisting of 10% acetylene and 90% nitrogen by volume is then caused to flow through so that the gas contacts the catalyst. However, in this manufacturing method as well, the rate of coil production is small, and thus this method is extremely inadequate as an industrial mass production method.

Under such conditions, the present inventors discovered a method for the mass production of carbon nanocoils at the end of 1999. This method is disclosed in Japanese Patent Application No. 11-377363.

In this method, an indium-tin-iron type catalyst is placed inside a reaction vessel, the area in the vicinity of this catalyst is heated to a temperature that is equal to or greater than the temperature at which a hydrocarbon gas is broken down by the catalyst, and a hydrocarbon gas is caused to flow through so as to contact the catalyst, thus causing the growth of carbon nanocoils on the surface of the catalyst. The production rate of this method is a maximum of 95% or greater. Thus, this method allows the mass production of carbon nanocoils.

The core of the above-described manufacturing method lies in the indium-tin-iron type catalyst. The lowering of the manufacturing cost of carbon nanocoils is determined by how inexpensively the indium-tin-iron type catalyst can be provided. The present inventors prepared an indium-tin-iron type catalyst by vacuum-evaporating an iron film on a commercially marketed ITO (indium-tin-oxide) substrate. Since the ITO substrate is expensive, and since the catalyst is prepared by the vacuum evaporation of iron, which is a method unsuited to mass production, the resulting indium-tin-iron type catalyst is extremely expensive.

ITO substrates are transparent substrates which consist of an indium oxide and tin oxide and possess electrical conductivity and a high light transmissivity. Such substrates have been adapted for practical use as industrial materials which are indispensable in opto-electronics, etc. The high cost of such ITO substrates is attributable to the method used to manufacture these substrates. There are three main manufacturing methods.

The first method is a spray method. In this method, a mixed solution consisting of $InCl_3$, $SnCl_4$, $H_2O$, HCl and an alcohol is sprayed onto a substrate, and this substrate is then baked at approximately 500° C. In this method, chlorine type gases are generated in the baking process. Thus, problems such as contamination of the environment and corrosion of the apparatus, etc. occur.

The second method is a CVD (chemical vapor deposition) method. In this method, an In chelate and dibutyltin diacetate are used as raw materials, and manufacture is accomplished by CVD method using $N_2$ gas as a carrier at a substrate temperature of approximately 500° C. Since this method is performed inside a sealed vessel, it is unsuitable for mass production.

The third method is a vacuum evaporation method. In this method, In and Sn are used as evaporation sources, and vacuum evaporation for formation is performed at a substrate temperature of approximately 400° C. Since the operation is performed inside a vacuum apparatus, it is not suitable for mass production.

Thus, since conventional indium-tin-iron type catalysts are manufactured by the vacuum evaporation of iron on an expensive ITO substrate, the manufacturing cost is high, and then mass production is impossible. As a result, the inexpensive mass production of carbon nanocoils is considered impossible.

SUMMARY OF THE INVENTION

Accordingly, the object of the present invention is to realize the mass production of carbon nanocoils and a reduction in the cost of carbon nanocoils by establishing an inexpensive method for the mass production of an indium-tin-iron type catalyst.

The above object is accomplished by the unique manufacturing method of the present invention for manufacturing an indium-tin-iron type catalyst which is used to produce carbon nanocoils that have an external diameter of 1000 nm or less, wherein the manufacturing method comprises:

a first process that forms an organic solution by mixing an indium-containing organic compound and a tin-containing organic compound with an organic solvent, a second process that forms an organic film by coating a substrate with the thus obtained organic solution, a third process that form an indium-tin film by baking this organic film, and a fourth process that forms an iron film on the surface of the indium-tin film.

In the above method, the indium-tin film is a mixed film of an indium oxide and a tin oxide.

Furthermore, in the above fourth process, the iron film on the surface of the indium-tin film is formed by electroplating.

The above object is further accomplished by another unique manufacturing method of the present invention for manufacturing an indium-tin-iron type catalyst which is used to produce carbon nanocoils that have an external diameter of 1000 nm or less, wherein the manufacturing method comprises:

a first process that forms an organic solution by mixing an indium-containing organic compound, a tin-containing organic compound and an iron-containing organic compound with an organic solvent, a second process that forms an organic film by coating a substrate with the thus obtained organic solution, and a third process that forms an indium-tin-iron film by baking the organic film.

DETAILED DESCRIPTION OF THE INVENTION

The inventors of the present application conducted diligent research in order to realize an inexpensive indium-tin-iron type catalyst. As a result, the inventors created a method in which an indium-tin-iron type catalyst is firmly formed and carried on a substrate by way of dissolving metallo-organic compounds in an organic solvent, coating the substrate with the resulting organic solution and then baking this coating.

The method of the present invention for manufacturing an indium-tin-iron type catalyst is in fact comprised of two methods.

The first method comprises a first process in which an organic solution is formed by mixing an indium-containing organic compound and a tin-containing organic compound with an organic solvent, a second process in which an organic film is formed by coating a substrate with this organic solution, a third process in which an indium-tin film is formed by baking this organic film, and a fourth process in which an iron film is formed on the surface of this indium-tin film.

The second method comprises a first process in which an organic solution is formed by mixing an indium-containing organic compound, a tin-containing organic compound and an iron-containing organic compound with an organic solvent, a second process in which an organic film is formed by coating a substrate with this organic solution, and a third process in which an indium-tin-iron film is formed by baking this organic film.

As the indium-containing organic compound, tin-containing organic compound and iron-containing organic compound used in the present invention, known organo-metallic compounds are employed. Examples of such compounds include, among others, trimethylindium, triphenylindium, indium octylate, indium carboxylate, triethyltin, trimethyltin, tetraphenyltin, tin octylate, tin carboxylate, iron carboxylate, iron carbonyl, iron carbonyl derivatives, iron nitrosyl and iron nitrosyl derivatives. Various other types of known organo-metal complexes, etc. may also be used. Metallo-organic compounds that are soluble in organic solvents are especially useful.

The organic solvents that are used in the present invention include known organic solvents such as acetone, toluene, benzene and alcohols. Organic solvents that can dissolve indium-containing organic compounds, tin-containing organic compounds and iron-containing organic compounds are especially useful.

In the present invention, an indium-containing organic compound and a tin-containing organic compound, or an indium-containing organic compound, a tin-containing organic compound and an iron-containing organic compound, are dissolved in an organic solvent. Then, this solution is applied as a coating to the surface of a substrate such as a plate or tube etc., consisting of a glass, ceramic, etc., and the solvent is evaporated so that an organic film is formed on the substrate.

Coating methods that can be used in the present invention include various types of methods such as dipping of the substrate in the organic solution, brush coating of the substrate, spraying onto the substrate, and spin-coating on the substrate, etc.

Furthermore, a method such as heat-drying, natural air draft drying, warm air draft drying or hot air draft drying is used in the present invention to dry the substrate following the coating process.

Next, the above-described organic film is baked so that the organic component is broken down and dispersed, thus forming an indium-tin film or indium-tin-iron film on the surface of the substrate. The baking temperature is set at a temperature that is equal to or greater than the decomposition temperatures of the metallo-organic compounds. Accordingly, the baking temperature depends on the types of metallo-organic compounds used. Generally, a temperature of 400° C. to 800° C. is desirable.

In one case, the indium-tin film is constructed from metallic indium and metallic tin; and in another case, it is constructed from an indium oxide and a tin oxide. The former film is comprised of a metallic body, while the latter case results in a so-called ITO substrate.

In the indium-tin-iron film, there may be cases in which this film is comprised of a metallic body constructed from metallic indium, metallic tin and metallic iron and cases in which the film comprises a mixed metal oxide body constructed from an indium oxide, tin oxide and iron oxide. Such an indium-tin-iron film functions "as is" as an indium-tin-iron type catalyst.

The indium-tin-iron type catalyst is completed by forming an iron film on the surface of the indium-tin film. Methods that can be used to form this iron film include various types of known methods such as physical vacuum evaporation, CVD and sputtering. Among such methods, however, electroplating, which is efficient and inexpensive, is especially effective. Furthermore, the iron film in the present invention may also be formed by way of coating the surface of the indium-tin film with an organic solution of an iron-containing organic compound and then baking the resulting film. In other words, such a method is a two-stage baking method that involves the indium-tin film and the iron film.

There are no particular restrictions on the thickness of the indium-tin film. For instance, the thickness may range from 10 nm to several microns. It is also preferable that the thickness of the iron film that is formed on top of the indium-tin film be small so that the underlying indium-tin film can contribute to the formation of the carbon nanocoils. For instance, the iron film has a thickness of 5 nm to 100 nm though the thickness is not limited to this range of numerical values. In the case of an indium-tin-iron film, the surface of the film contributes to the formation of carbon nanocoils. Accordingly, there are no restrictions on the thickness of the film. In other words, the thickness may range, for example, from 10 nm to several microns (m).

Below, examples of the method of the present invention for manufacturing an indium-tin-iron type catalyst for use in the production of carbon nanocoils will be described in detail.

First Example: Catalyst Consisting of Indium-Tin Film and Iron Film 8.1 g of indium octylate and 0.7 g of tin octylate were mixed with 100 ml of toluene, and these were uniformly dissolved by way of applying an ultrasonic vibration. This organic solution was applied to a glass plate with a brush and then dried with a warm air draft, thus forming an organic film. The obtained organic film was baked by placing this glass substrate in a heating furnace at 500° C. for 20 minutes. The organic component was thus pyrolyzed, and an indium-tin film was formed. The thickness of this indium-tin film was 300 nm. Furthermore, with this glass substrate used as a cathode, the surface of the indium-tin film was electroplated with iron, thus producing an indium-tin-iron type catalyst. The thickness of the iron film that was formed was 50 nm.

The substrate on which the indium-tin-iron type catalyst was formed was placed in a quartz tube. The tube was filled with helium gas, and the temperature in the vicinity of the substrate was elevated to 700° C. After the temperature reached 700° C., ⅓ of the helium was replaced with acetylene gas, and the mixed gas was caused to flow through for one hour at a flow, rate of 250 sccm. Afterward, the acetylene was cut off, so that only helium was caused to flow through, and the reaction system was cooled to room temperature.

The glass substrate was observed under a scanning electron microscope, and countless carbon nanocoils were observed on the surface of the iron film. It was found from the weight ratio of the amount of acetylene used and the carbon nanocoils produced that the coil yield was 90%. Since the maximum yield obtained in conventional ITO substrate was used was 95%, it is determined that the indium-tin-iron type catalyst prepared in the First Example can be used for the inexpensive mass production of carbon nanocoils.

Second Example: Catalyst Consisting of Indium-Tin-Iron Film 8.1 g of indium octylate, 0.7 g of tin octylate and 0.7 g of iron octylate were mixed with 100 ml of toluene, and these were uniformly dissolved by way of applying an ultrasonic vibration. This organic solution was sprayed onto a glass plate and dried by means of a natural air draft from a fan, thus forming an organic film. The obtained organic film was baked by way of placing the glass substrate in a heating furnace at 450° C. for 30 minutes. The organic component was thus pyrolyzed so that a catalyst consisting of an indium-tin-iron film was produced. The thickness of this indium-tin-iron film was 400 nm.

The substrate on which this indium-tin-iron type catalyst was formed was placed inside a quartz tube, and carbon nanocoils were produced by the same method as in the First Example. When the glass substrate was observed under a scanning electron microscope, countless carbon nanocoils were observed on the surface of the film. It was found that the coil yield was 85%. Accordingly, it is determined that the indium-tin-iron type catalyst prepared in the Second Example can be used for the inexpensive mass production of carbon nanocoils.

The present invention is indeed not limited to the above Examples. Various modifications, design changes, etc. that involve no departure from the technical concept of the present invention are included in the technical scope of the present invention.

As seen from the above, in the present invention, an indium-tin film is formed merely by coating a substrate with an organic solution of an indium-containing organic compound and a tin-containing organic compound and then by baking this coating. Consequently, an indium-tin-iron type catalyst can be mass-produced simply and inexpensively. A reduction in the manufacturing cost of carbon nanocoils and mass production of such carbon nanocoils are as a result realized.

In the present invention, the indium-tin film is a mixed film of an indium oxide and a tin oxide. Thus, the physical structure is substantially the same to that of a conventional ITO substrate. By way of forming an iron film on top of this mixed film, the conventional maximum yield of 95% obtained using an ITO substrate can be realized.

Furthermore, an iron film is formed on the surface of the indium-tin film by electroplating. Accordingly, an indium-tin-iron type catalyst can be manufactured very inexpensively and in large quantities. As a result, the manufacturing cost of carbon nanocoils is reduced, and mass production of such carbon nanocoils is realized.

In addition, an indium-tin-iron film can be formed on a substrate in a single operation merely by coating the substrate with an organic solution of an indium-containing organic compound, a tin-containing organic compound and an iron-containing organic compound, and then by baking this coating. As a result, an indium-tin-iron type catalyst is produced inexpensively and in large quantities. Accordingly, the manufacturing cost of carbon nanocoils is reduced, and such carbon nanocoils can be mass-produced.

What is claimed is:

1. A method for manufacturing an indium-tin-iron catalyst which is used to manufacture carbon nanocoils that have an external diameter of 1000 nm or less, said manufacturing method comprising the steps of:

forming an organic solution by mixing an indium-containing organic compound and a tin-containing organic compound with an organic solvent, forming an organic film by coating a substrate with said organic solution, forming an indium-tin film by baking said organic film, and forming an iron film on a surface of said indium-tin film.

2. The method according to claim 1, wherein said indium-tin film is a mixed film of an indium oxide and a tin oxide.

3. The method according to claim 1, wherein said iron film is formed on said surface of said indium-tin film by electroplating.

4. A method for manufacturing an indium-tin-iron catalyst which is used to manufacture carbon nanocoils that have an external diameter of 1000 nm or less, said manufacturing method comprising the steps of:

forming an organic solution by mixing an indium-containing organic compound, a tin-containing organic compound and an iron-containing organic compound with an organic solvent, forming an organic film by coating a substrate with said organic solution, and forming an indium-tin-iron film by baking said organic film.

* * * * *